(12) United States Patent  (10) Patent No.: US 8,196,955 B2
Mendez  (45) Date of Patent: Jun. 12, 2012

(54) AIRBAG SYSTEM

(75) Inventor: Gerardo Mendez, West Bloomfield, MI (US)

(73) Assignee: TK Holdings Inc., Auburn Hills, MI (US)

( * ) Notice: Subject to any disclaimer, the term of this patent is extended or adjusted under 35 U.S.C. 154(b) by 127 days.

(21) Appl. No.: 12/662,129

(22) Filed: Mar. 31, 2010

(65) Prior Publication Data

US 2011/0001307 A1  Jan. 6, 2011

Related U.S. Application Data

(66) Substitute for application No. 61/213,674, filed on Jul. 1, 2009.

(51) Int. Cl.
*B60R 21/16* (2006.01)

(52) U.S. Cl. .................... 280/729; 280/743.1; 280/743.2

(58) Field of Classification Search ............... 280/743.1, 280/743.2, 729
See application file for complete search history.

(56) References Cited

U.S. PATENT DOCUMENTS

| 6,846,010 B2* | 1/2005 | Enders ........................ 280/730.2 |
| 6,886,858 B2* | 5/2005 | Olson ......................... 280/743.2 |
| 7,025,376 B2 | 4/2006 | Dominissini |
| 7,357,413 B2* | 4/2008 | Noguchi et al. ........... 280/730.2 |
| 7,396,043 B2* | 7/2008 | Choi et al. ................. 280/743.1 |
| 7,712,770 B2* | 5/2010 | Kalliske et al. ............... 280/729 |
| 7,918,482 B2* | 4/2011 | Sugimoto et al. ............. 280/729 |
| 7,946,613 B2* | 5/2011 | Rose et al. .................... 280/729 |
| 2005/0206138 A1 | 9/2005 | Breuninger et al. |

* cited by examiner

*Primary Examiner* — Toan To
(74) *Attorney, Agent, or Firm* — Foley & Lardner LLP

(57) ABSTRACT

An airbag module for protecting an occupant of a vehicle includes an airbag including an inflatable portion and an inflator for providing inflation gas for inflating the inflatable portion of the airbag. The airbag includes a non-inflatable portion located within the inflatable portion so that in the longitudinal direction of the vehicle the non-inflatable portion is bounded on both sides by the inflatable portion of the airbag and wherein the non-inflatable portion extends the entire cross vehicle width of the airbag. The airbag is configured to inflate into a position so that a surface of the airbag faces the occupant. The stiffness of the inflatable portion varies along the surface facing the occupant based on a changing distance from the surface to the non-inflatable portion.

20 Claims, 10 Drawing Sheets

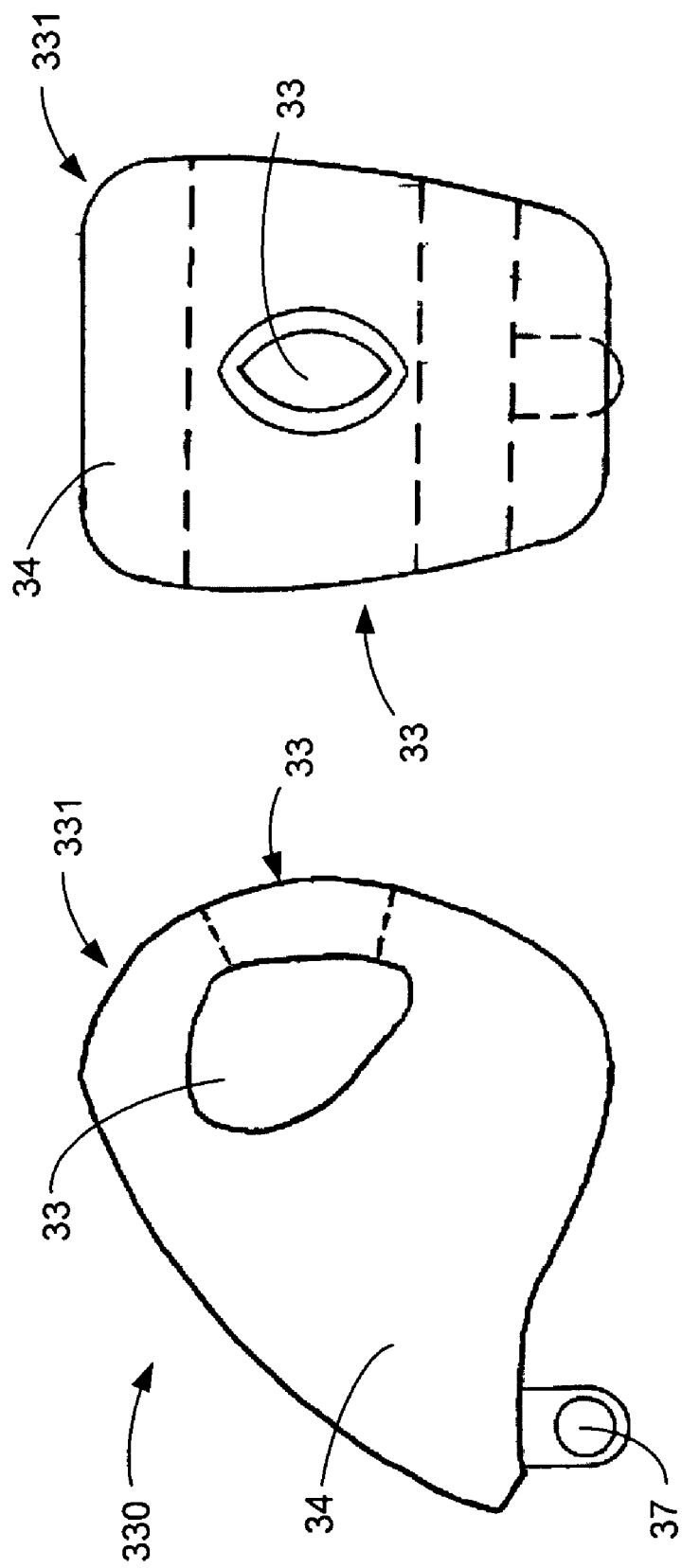

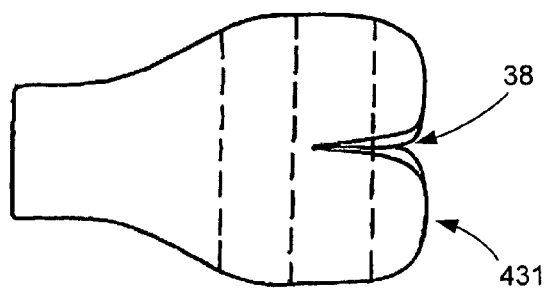
FIG. 10c
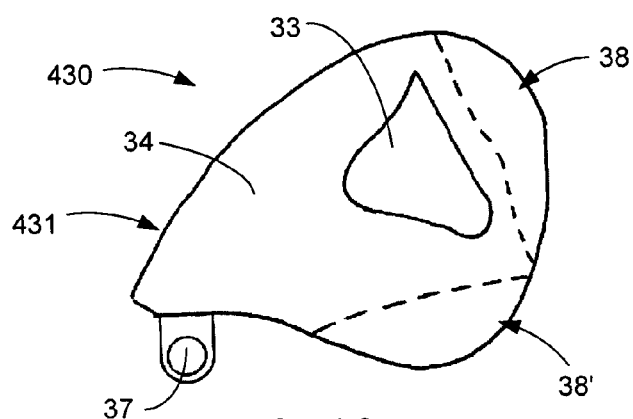
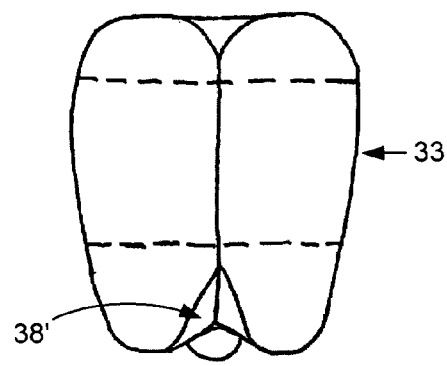
FIG. 10a  FIG. 10b
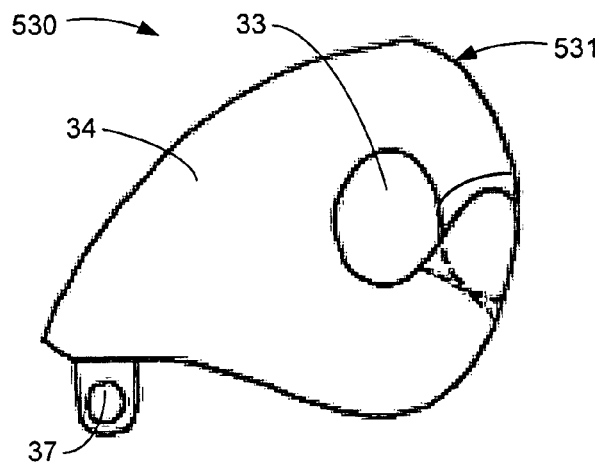
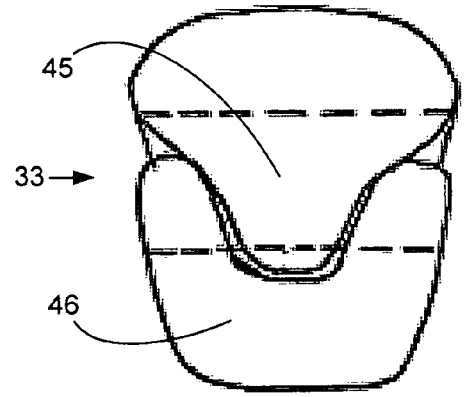
FIG. 11a  FIG. 11b

AIRBAG SYSTEM

CROSS-REFERENCE TO RELATED APPLICATIONS

This application claims priority to and the benefit of U.S. Provisional Application No. 61/213,674, filed Jul. 1, 2009, the entirety of which is herein incorporated by reference.

BACKGROUND

The present disclosure relates generally to the field of airbags for use in motor vehicles. More specifically, this disclosure relates to an airbag having a non-inflated portion, upon deployment, to tailor the restraint forces, which may vary along different portions of the airbag, to reduce the likelihood of injury of the occupant.

Airbags are one type of restraint system typically located in vehicles to protect occupants from injury during a vehicle dynamic impact event. Typical restraint systems include sensors located in the vehicle to initiate deployment of the airbag. An airbag may deploy and inflate, by gas rapidly entering the airbag, typically through the use of an inflator containing an explosive charge (e.g., pyrotechnic device). Passenger airbags are typically stored within and deployed from the vehicle dashboard or instrument panel, and are typically packaged through a process of folding and rolling to compact the airbag in order to minimize its required packaging space. During a vehicle dynamic impact event, a passenger airbag may deploy from the upper portion (i.e., above the glove box) of the dashboard, in substantially rearward and upward directions to protect the head and torso of the occupant. A passenger airbag may also deploy from the rear facing portion of the dashboard in substantially a rearward direction towards the occupant. Driver airbags are typically stored within the steering column and are typically packaged through a process of folding and rolling to compact the airbag in order to minimize its required packaging space. During a vehicle dynamic impact event, a driver airbag may deploy in substantially a rearward direction towards the driver to protect the head and torso of the driver.

It has been known to construct a vehicle to include an airbag having a single chamber whereby the gas generated by an inflator is directly forced into the airbag chamber, unfolding and expanding the airbag chamber to provide protection to the vehicle occupant during a vehicle impact. This method of air bag construction may involve mounting the air bag on the top facing surface of the dashboard or on the rear facing surface of the dashboard. It has also been known to construct a bi-lobular air bag, which comprises of a single chamber having two side by side lobes separated by a gap or void, but each lobe being directly inflated by the inflator. These methods of construction have several disadvantages, the key disadvantage being that during deployment of the air bag, each lobe will have substantially similar expansion forces, therefore exerting substantially uniform restraint forces onto all areas of contact with the occupant.

It would be advantageous for an airbag to be constructed to include at least one non-inflated portion (or volume), whereby the size, shape, and location of the non-inflated portion may be configured to tailor the reaction (or restraint) forces from the different portions of the airbag. An airbag having tailored restraint forces, during deployment, may mitigate occupant injury by providing restraint forces optimized for different regions of the occupant (e.g., head and neck regions), according to the varying mass of the different regions of the occupant (e.g., the head has a lower mass than the torso of an occupant). This configuration would provide optimized occupant protection and reduce head and neck injuries.

SUMMARY

According to one exemplary embodiment, an airbag module for protecting an occupant of a vehicle includes an airbag including an inflatable portion and an inflator for providing inflation gas for inflating the inflatable portion of the airbag. The airbag includes a non-inflatable portion located within the inflatable portion so that in the longitudinal direction of the vehicle the non-inflatable portion is bounded on both sides by the inflatable portion of the airbag and wherein the non-inflatable portion extends the entire cross vehicle width of the airbag. The airbag is configured to inflate into a position so that a surface of the airbag faces the occupant. The stiffness of the inflatable portion varies along the surface facing the occupant based on a changing distance from the surface to the non-inflatable portion.

According to another exemplary embodiment, an airbag module for protecting an occupant of a vehicle includes an airbag including an inflatable portion and an inflator for providing inflation gas for inflating the inflatable portion of the airbag. The airbag includes a non-inflatable portion located within the inflatable portion. The non-inflatable portion extends the entire cross vehicle width of the airbag. The airbag is configured to inflate into a position so that a surface of the airbag faces the occupant. A volumetric ratio of a volume of a space enveloped by the inflatable portion to a volume of the inflatable portion only is greater than or equal to 1.2.

According to another exemplary embodiment, an airbag module for protecting an occupant of a vehicle includes an airbag including an inflatable portion and an inflator for providing inflation gas for inflating the inflatable portion of the airbag. The airbag includes a non-inflatable portion located within the inflatable portion so that in the longitudinal direction of the vehicle the non-inflatable portion is bounded on both sides by the inflatable portion of the airbag. The non-inflatable portion extends the entire cross vehicle width of the airbag. The airbag is configured to inflate into a position so that a surface of the airbag faces the occupant. The inflatable portion includes first and second fluidly connected inflatable chambers by a flow restricting channel. The second inflatable chamber is located adjacent to the surface of the airbag facing the occupant. Inflation gas enters the second inflatable chamber after passing through the first inflatable chamber and the flow restricting channel so that after initiation of the inflator and prior to completion of the inflation of the airbag the stiffness of the airbag at a point on the surface adjacent the second inflatable chamber is less than the stiffness of the airbag at a point on the surface adjacent the first inflatable chambers.

According to another exemplary embodiment, an airbag module for protecting an occupant of a vehicle includes an airbag including an inflatable portion and an inflator for providing inflation gas for inflating the inflatable portion of the airbag. The airbag includes a low pressure inflatable portion located within the inflatable portion so that in the longitudinal direction of the vehicle the low pressure inflatable portion is bounded on both sides by the inflatable portion of the airbag. The low pressure inflatable portion extends the entire cross vehicle width of the airbag. The airbag is configured to inflate into a position so that a surface of the airbag faces the occupant. The inflatable portion includes first and second fluidly connected inflatable chambers by a flow restricting channel.

The second inflatable chamber is located adjacent to the surface of the airbag facing the occupant. Inflation gas enters the second inflatable chamber after passing through the first inflatable chamber and the flow restricting channel. The second inflatable chamber includes a vent to allow inflation gas to escape from the second inflatable chamber into the low pressure inflatable chamber so that low pressure inflatable chamber inflates to a pressure less than the first and second inflatable chambers.

According to another exemplary embodiment, an airbag module for protecting an occupant of a vehicle includes an airbag including an inflatable portion and an inflator for providing inflation gas for inflating the inflatable portion of the airbag. The airbag includes a non-inflatable portion located within the inflatable portion so that in the longitudinal direction of the vehicle and in the cross vehicle direction the non-inflatable portion is bounded on all four sides by the inflatable portion of the airbag.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 9a is a cross-car view of a passenger airbag assembly with a non-inflated portion, shown in the unfolded or deployed state, according to another exemplary embodiment.

FIG. 9b is a rear view of the airbag assembly of FIG. 9a shown in the unfolded or deployed state, according to an exemplary embodiment.

FIG. 10a is a cross-car view of a passenger airbag assembly with a non-inflated portion, shown in the unfolded or deployed state, according to another exemplary embodiment.

FIG. 10b is a rear view of the airbag assembly of FIG. 10a, shown in the unfolded or deployed state, according to an exemplary embodiment.

FIG. 10c is a top view of the airbag assembly of FIG. 10a, shown in the unfolded or deployed state, according to an exemplary embodiment.

FIG. 11a is a cross-car view of a passenger airbag assembly with a non-inflated portion, shown in the unfolded or deployed state, according to another exemplary embodiment.

FIG. 11b is a rear view of the airbag assembly of FIG. 11a, shown in the unfolded or deployed state, according to an exemplary embodiment.

DETAILED DESCRIPTION

Referring generally to the FIGURES, airbag assemblies are disclosed, which include airbags having non-inflated portions to improve restraint and reduce impact of the occupant during a vehicle dynamic impact event. Restraint of the occupant is improved by reducing the restraint forces imparted from the airbag to the occupant by reducing the deflection and acceleration the occupant undergoes during a vehicle impact event, and by having a tailored stiffness, which may be variably configured along the profile of the airbag to further reduce restraint forces imparted onto vital areas of the occupant, such as the head and neck regions.

Figure 1:
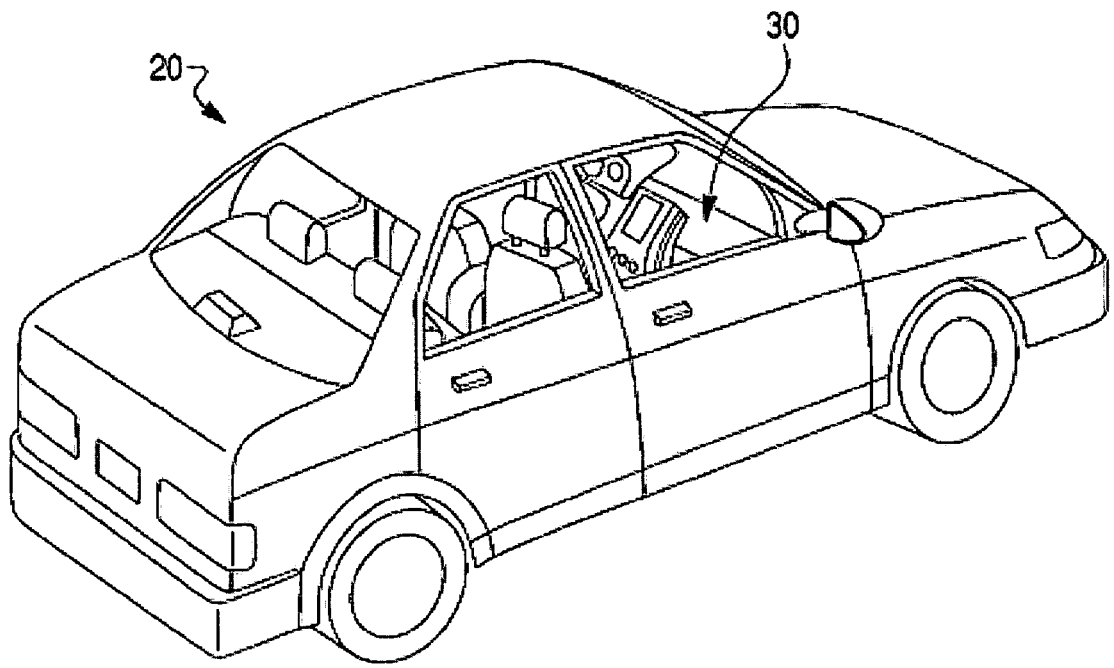
FIG. 1 is a perspective view of a motor vehicle, according to an exemplary embodiment.

Referring to FIG. 1, an exemplary embodiment of a motor vehicle 20 is illustrated and includes an airbag assembly 30. The vehicle 20 is illustrated as a typical sedan, but the device of this disclosure may be used within any type of passenger vehicle as well as other moving vehicles that offer occupant protection to seated passengers in the form of frontal airbags. The airbag assembly 30 may be used within the vehicle 20 to provide any occupant (e.g., driver, passenger) of the vehicle 20 with frontal protection during a vehicle dynamic event that triggers deployment of the airbag assembly 30.

Figure 2:
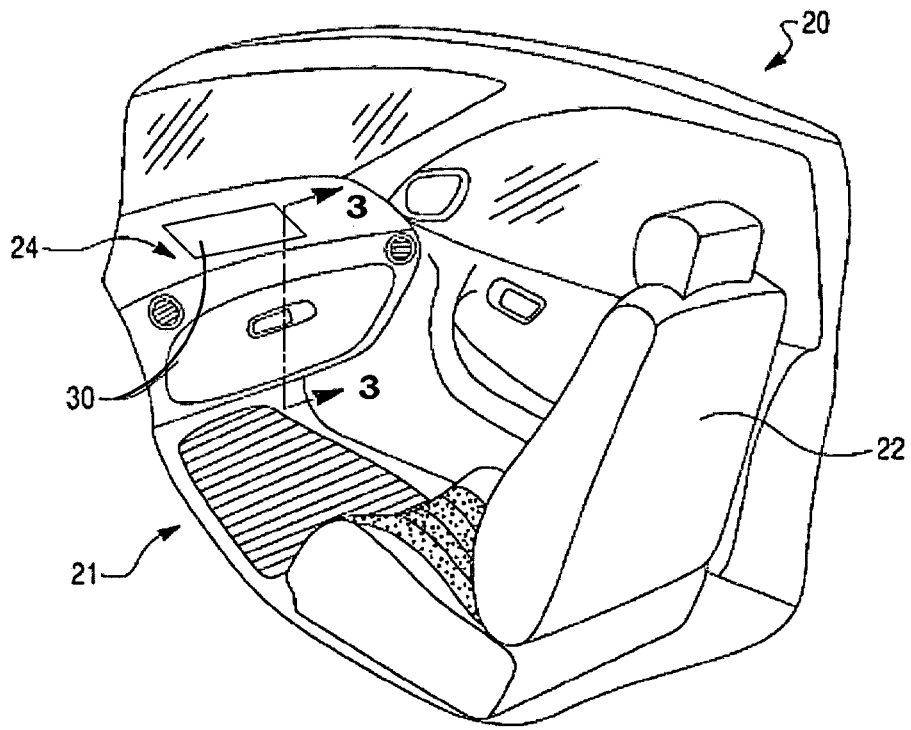
FIG. 2 is a perspective view of the interior passenger compartment of a motor vehicle that includes a passenger air bag integrated into the dashboard, according to an exemplary embodiment.

Referring to FIG. 2, the passenger compartment 21 of the vehicle 20 of FIG. 1 is illustrated, according to an exemplary embodiment, and includes a seat assembly 22, a dashboard assembly 24, and an airbag assembly 30. The airbag assembly 30 may be coupled to the dashboard assembly 24 to accommodate varying customer packaging requirements. According to another exemplary embodiment, the airbag assembly 30 may be incorporated within or as part of the dashboard assembly 24, such that the vehicle manufacturer will install one assembly opposed to separate assemblies. The airbag assembly 30 is flexibly configurable for use in varying package requirements, and may be tailored to satisfy specific needs of the vehicle manufacturer.

Figure 3:
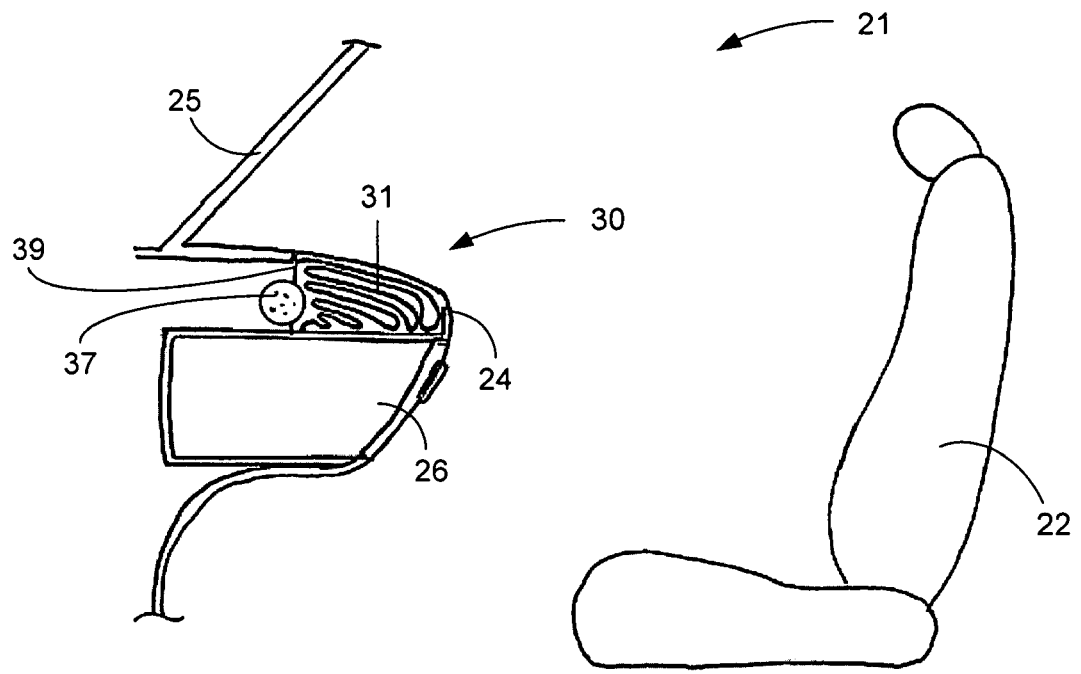
FIG. 3 is a cross-car section view of the interior passenger compartment of FIG. 2, taken along line 3-3, illustrating the airbag assembly in the folded or undeployed state, according to an exemplary embodiment.

Referring to FIG. 3, the airbag assembly 30 is illustrated in the undeployed state and in its stored position. The airbag assembly 30 is shown stored within the dashboard 24, above the glove-box 26, and rearward of the windshield 25. According to other embodiments, the airbag assembly 30 may be configured within or coupled to the glove-box 26. According to an exemplary embodiment, the airbag assembly 30 includes an airbag 31, a gas generator (or inflator) 37, and a housing 39. The housing 39 may be made from steel or other useful material (e.g., aluminum, magnesium, composite, polymer) and configured for attachment to the dashboard 24, the glove-box 26, or any other useful component of the vehicle 20. The housing 39 may further provide structural support to the airbag assembly 30, may store the folded airbag 31, and may retain the gas generator 37.

Figure 4:
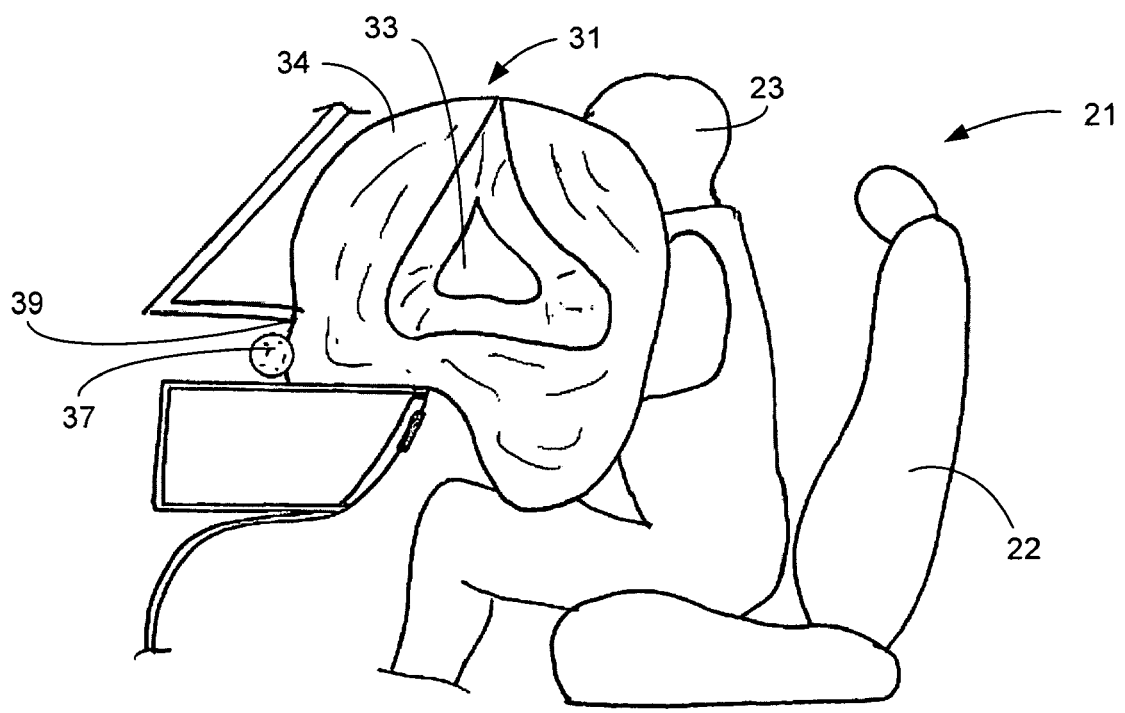
FIG. 4 is a cross-car partial section view of the interior passenger compartment of FIG. 3 illustrating the airbag assembly with a non-inflated portion, shown in an unfolded or deployed state, according to an exemplary embodiment.

Referring to FIG. 4, the airbag 31 is illustrated in its deployed or unfolded state, providing frontal protection to the occupant 23 seated in the seat assembly 22 of the passenger compartment 21. During a vehicle dynamic impact that triggers deployment of the airbag 31, the gas generator 37 generates inflation gas, typically through the use of an explosive charge (e.g., pyrotechnic device). The inflation gas is then forced into the inflatable chambers of the airbag 31, such as the first inflated chamber or inflatable portion 34. The gas causes the airbag 31 to expand, breaching the dashboard assembly 24, and then to deploy and unfold toward the occupant 23 seated in the seat assembly 22. As the inflatable chambers fill with inflation gas, the airbag 31 deploys in substantially upward and rearward directions toward the occupant to protect the head and torso of the occupant 23. Upon deployment, the airbag 31 includes the first inflated chamber or inflatable portion 34 and a non-inflatable or less inflatable portion 33.

The occupant 23 displaces in the forward direction due to acceleration induced by a frontal impact of the vehicle 20, and comes into contact with the deploying airbag 31, which minimizes the displacement and the acceleration of the occupant 23. By reducing the displacement and acceleration of the occupant 23, the force and energy imparted onto the occupant 23 are reduced, reducing impact of the occupant 23.

Figure 5A:
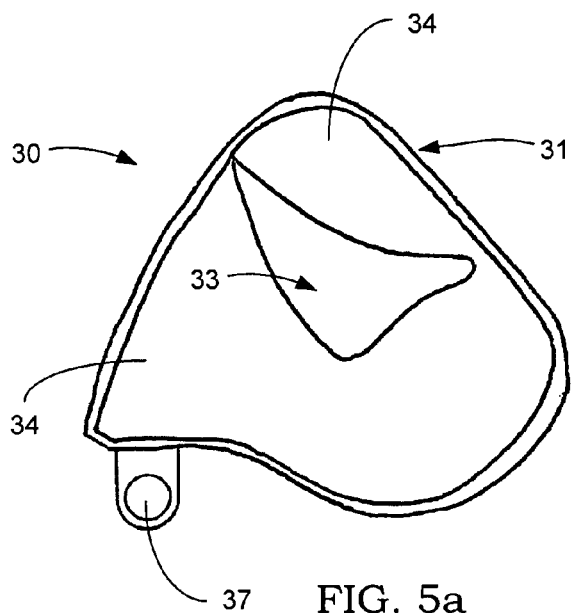
FIG. 5a is a cross-car view of a passenger airbag assembly with a non-inflated portion shown in the unfolded or deployed state, according to an exemplary embodiment.
Figure 5B:
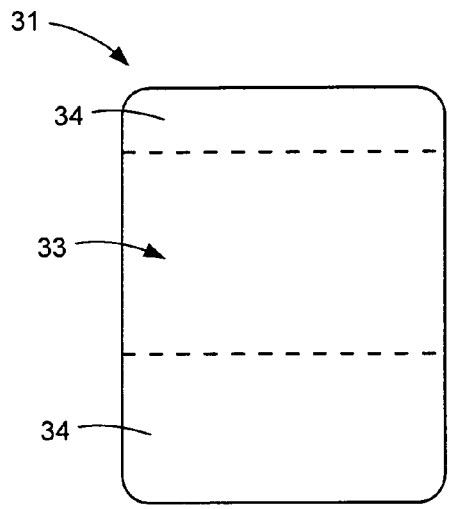
FIG. 5b is a rear view of the airbag assembly of FIG. 5a shown in the unfolded or deployed state, according to an exemplary embodiment.
Figure 6:
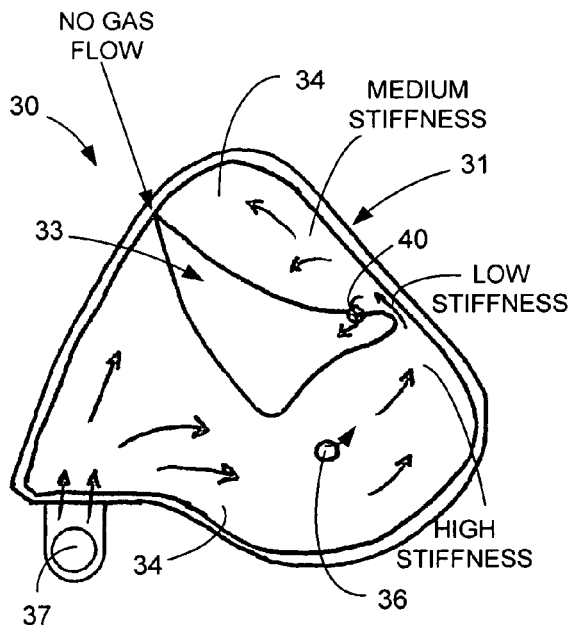
FIG. 6 is a cross-car section view of the airbag assembly of FIG. 5a, illustrating the gas flow within the airbag assembly during deployment or unfolding, according to an exemplary embodiment.

Referring to FIGS. 5-10, the airbag assembly 30 is shown in the deployed or unfolded state, according to an exemplary embodiment, and includes the airbag 31 and the gas generator 37. The airbag 31 may be made from a traditional airbag material, such as high strength nylon, and may comprise of one or more than one panel coupled through a conventional method, such as stitching. When deployed, the airbag 31 includes at least one inflated chamber 34 and at least one non-inflated or less inflated portion 33. The inflated chamber 34 may include one or more than one portion, whereby each portion may or may not be interconnected with other portions. The portions of the inflated chamber 34 may be separate from the other portions, but each portion has the same internal pressure during deployment. According to other embodiments, airbags that have multiple chambers, may have different internal pressures from chamber to chamber, but different portions within each respective chamber should have the same internal pressure. According to some exemplary embodiments, the non-inflated or less inflated portion 33 may be a void within the airbag 31 (e.g., open to the atmosphere) that is not inflated (FIG. 6). In other exemplary embodiments, the non-inflated or less inflated portion 33 may be a second chamber (FIG. 7) having a lower pressure than the inflated chamber 34.

The airbag 31 is configured to inflate into a position where the non-inflated or less inflated portion 33 is defined or bounded by interior surfaces of the inflated chamber 34. In one exemplary embodiment, the ratio of the volume of a space enveloped by the inflatable portion 33 to a volume of the inflatable portion 33 may be greater than or equal to approximately 1.2. In other exemplary embodiments, the ratio may be greater than about 1.0, between about 1.2 and about 1.5, about 1.3, about 1.4, or about 1.5. A conventional airbag may have an inflatable space of about 120 L of gas, however the airbag described in the various exemplary embodiments herein may have an inflatable space of less than 120 L, between about 70 L and 100 L, or about 85 L.

The different portions may be configured to achieve a certain gas flow during airbag deployment. For example, as shown in FIG. 6, the inflation gas may flow in a counter-clockwise direction from the front of the airbag 31 to the lower-rear portion of the airbag 31, then up the center-rear portion to the upper-rear portion. Between the upper-rear portion and the upper front portion, the airbag 31 includes a point or an edge where the gas does not flow between portions of the inflated chamber 34. For example, the point or edge may be stitched, bonded, adhered, and/or otherwise joined together to prevent gas from flowing between the upper-rear and upper-front portions. According to other embodiments, the gas flow may be configured to flow in a clockwise direction, both clockwise and counter-clockwise directions, or any useful direction.

The non-inflated portion 33, according to the exemplary embodiment illustrated, may have a cross-car shape that is substantially triangular, which is positioned substantially central in the cross-car view to the deployed airbag 31, extending rearward and upward, and may also extend in the cross-car direction the entire width of the airbag 31 as shown in FIG. 5b. According to other exemplary embodiments, such as those illustrated in FIGS. 8a-8l, the non-inflated portion 33 may vary in shape (e.g., round, teardrop, polygon, random), taking the form of any useful shape, may vary in size, and may vary in position on the airbag 31. The configuration (e.g., shape, size, position) of the non-inflated portion 33 is not limited to those embodiments illustrated in FIGS. 8a-8l, rather the illustrated embodiments show that a non-inflated portion may take any shape that is advantageous to varying customer requirements. According to an exemplary embodiment, the non-inflated portion 33 may be a void within the airbag 31, which is not inflated during airbag deployment. The void may have a tailored geometry to adjust the stiffness and the volume of the airbag 31 to tailor restraint forces exerted onto the occupant during airbag deployment. According to another embodiment, the non-inflated portion 33 may be a portion of the airbag that is constructed (e.g., stitched) to not inflate during airbag deployment, or may be a portion of another fabric that is coupled (e.g., stitched) to the airbag to form a portion of the airbag which does not inflate during airbag deployment.

The non-inflated portion 33 affects the stiffness of the airbag 31, when deployed, by compressing, crumpling, or displacing when subjected to a lower force relative to the force required to compress or displace the portions of inflated chamber 34. The shape, size, and position of the non-inflated portion 33 primarily affect the stiffness of the airbag 31 and may be tailored specifically to achieve a predetermined displacement from a predetermined force. During a vehicle dynamic impact event, the occupant 23 (or a portion, such as the head, of the occupant 23), having a mass, displaces with an acceleration caused by the deceleration of the vehicle. This accelerating mass creates a force and a reaction force when the mass contacts another object, such as a deploying airbag. When the occupant 23 contacts the airbag 31, the airbag imparts restraint forces onto the occupant at the areas of contact, such as the head and torso, decelerating and protecting the occupant. The reaction forces exerted by the occupant onto the airbag displace (i.e., compress in the fore-aft direction) the airbag along the areas of contact. The displacement of the airbag and hence the force the airbag imparts onto the occupant are affected by the stiffness of the airbag 31. The non-inflated portion 33, having no internal pressure or a lower internal pressure relative to the inflated chamber, lowers the stiffness of the airbag 31 by having a lower stiffness relative to the stiffness of the inflated portions of the airbag. This lower stiffness allows the non-inflated portion 33 to collapse or compress when subjected to a lower force relative to the inflated chamber. Therefore the airbag 31 having a non-inflated portion 33 tailors the stiffness along the airbag profile to reduce the restraint forces imparted onto the contacting occupant, during airbag deployment, by absorbing energy generated from the vehicle impact.

The varying shape of the non-inflated portion 33 produces varying degrees of stiffness of the airbag 31 along the profile of the airbag which comes in contact with the occupant 23. The thicker portions of the non-inflated portion 33 and the thinner portions of the inflated chamber 34 (in the fore-aft direction) produce a lower stiffness relative to the thinner portions of the non-inflated portion 33 and the thicker portions of the inflated chamber 34. The substantially triangular shape and position of the non-inflated portion 33 illustrated in FIGS. 5-10 provide variable stiffness along the profile of contact of the airbag 31. This shape provides for a relative high stiffness for the portion below the non-inflated portion 33 that supports the chest and torso regions, while creating a relative medium stiffness for the portion above the rearward facing corner of the triangle of the non-inflated portion 33 that supports the head and neck regions, and also provides for a relative low stiffness in the portion of the rearward facing corner of the triangle that may support the head of a smaller occupant, such as a fifth percentile occupant. The relative high, medium, and low stiffness portions are illustrated in FIG. 6. Thus the non-inflated portion 33 of the airbag 31 is configured to provide varying stiffness to different body features of different size occupants, optimizing occupant protection.

Figure 14:
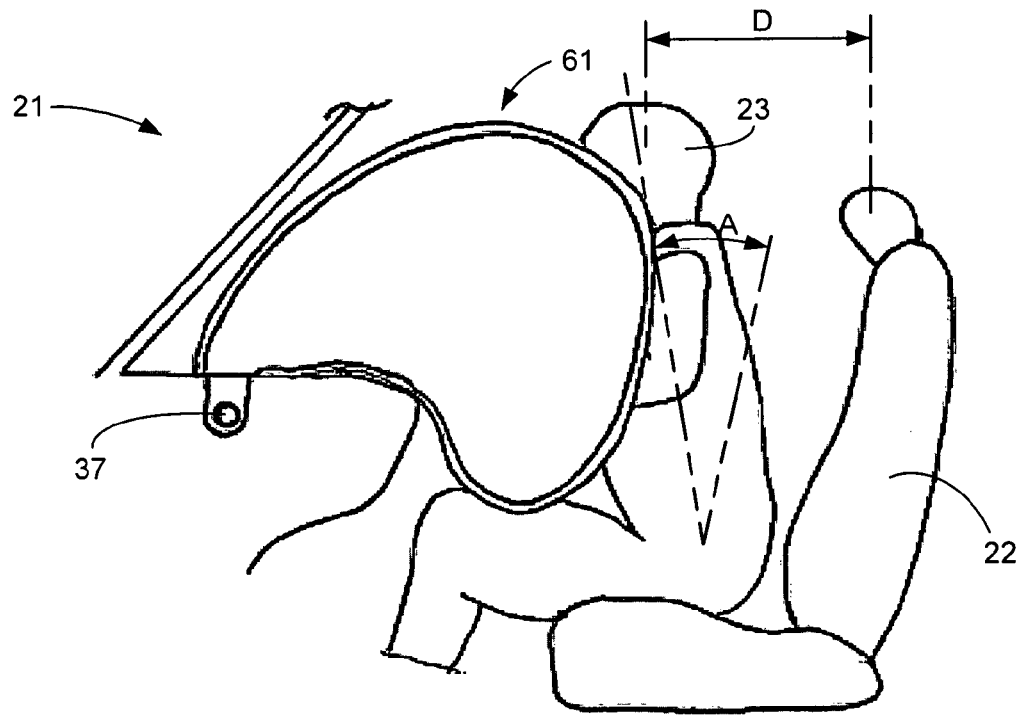
FIG. 14 is a cross-car view of a traditional passenger airbag assembly shown in the unfolded or deployed state and illustrating the deflection of the occupant, according to an exemplary embodiment.

The non-inflated portion 33 also affects the overall volume of the airbag 31. The airbag 31 having the non-inflated portion 33 will have less inflated volume (when deployed) than a conventional airbag, having substantially the same outer profile, such as illustrated in FIG. 14, due to the reduction in volume created by the non-inflated portion 33. This volume reduction could allow for the use of a smaller gas generator 37 for the airbag assembly 30, reducing weight and cost, or could allow for a shorter deployment time of the airbag assembly 30. According to another exemplary embodiment, the airbag 31 having the non-inflated portion 33 could have an increased outer profile with substantially the same inflated volume (when deployed) as an airbag assembly without a non-inflated portion. For example, an airbag could be lengthened in the fore-aft direction, bringing the deployed airbag closer to the occupant, and reducing the deflection or displacement the occupant undergoes during a vehicle crash prior to contact with the airbag, such as the airbag illustrated in FIG. 15.

The airbag 31 may further include one or more than one vent hole 36. According to the exemplary embodiment shown in FIG. 7, the airbag 31 of the airbag assembly 30 includes a first inflated chamber 34, a side panel 32, a second inflated chamber 35 (low pressure), two vent holes 36 to atmosphere, and a flow restricting channel or vent hole 40 between the chambers 34,35. The side panel 32 may be coupled to the inflated chamber 34 to form the second inflated chamber 35. The vent holes 36 may be used, as shown, to exhaust inflation gas from the inflated chamber 34 or the second inflated chamber 35 directly to the atmosphere (i.e., outside of the airbag assembly 30). The vent hole 40 may be used to transfer inflation gas from the first inflated chamber 34 to the second inflated chamber 35. According to other embodiments, a vent hole may be used to transfer or exhaust inflation gas to other areas, portions, or chambers of the airbag assembly, and those skilled in the art will recognize that vent holes are not limited to these illustrated embodiments.

Figure 7:
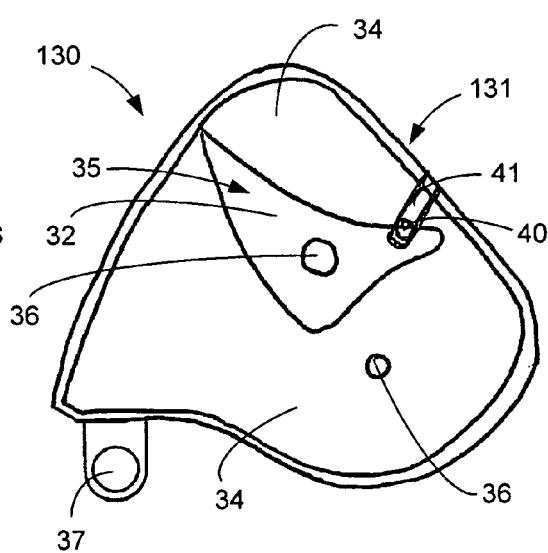
FIG. 7 is a cross-car view of an exemplary embodiment of a passenger airbag assembly with a low pressure inflatable portion and a tether shown in the unfolded or deployed state.
Figure 8C:
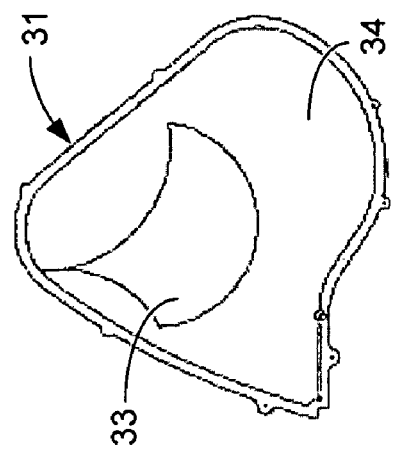
FIGS. 8a-8l are cross-car views of airbag assemblies shown in the unfolded or deployed state and illustrating various shapes of the non-inflated portions, according to various exemplary embodiments.
Figure 8F:
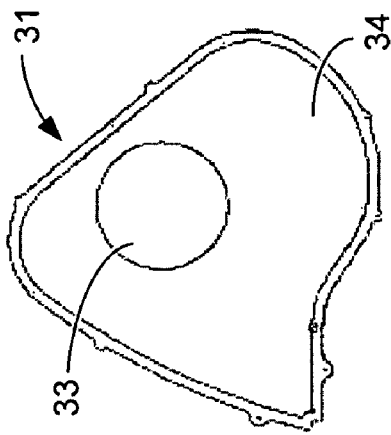
Figure 8B:
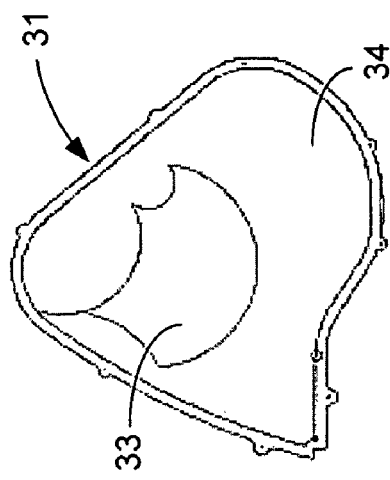
Figure 8E:
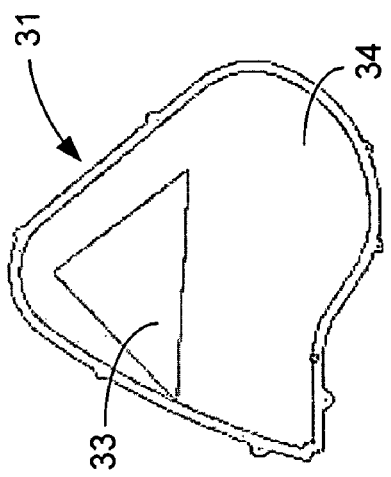
Figure 8A:
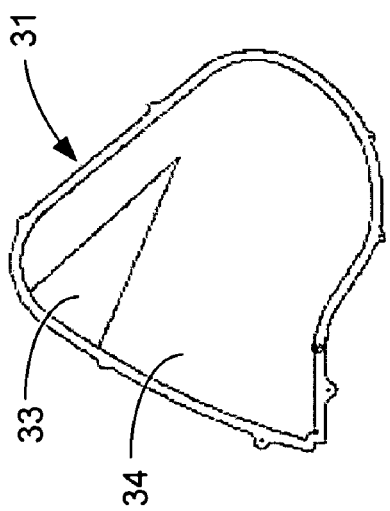
Figure 8D:
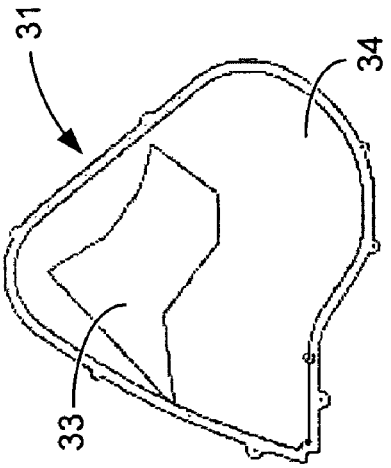
Figure 8G:
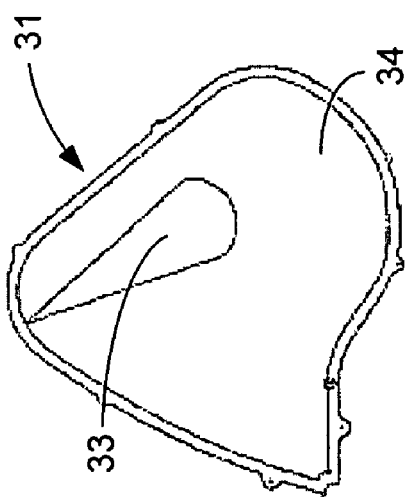
Figure 8H:
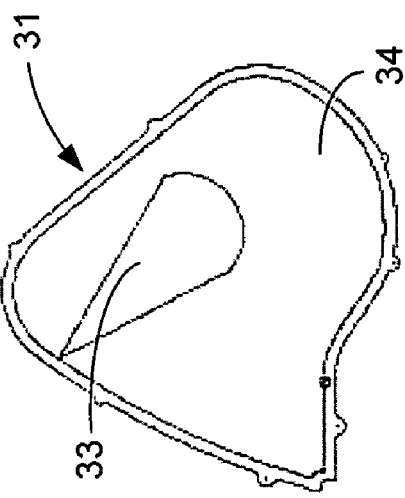
Figure 8I:
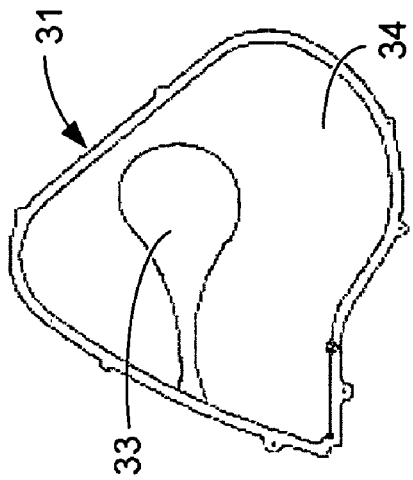
Figure 8J:
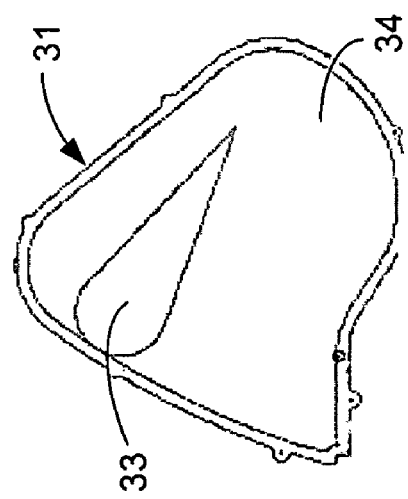
Figure 8K:
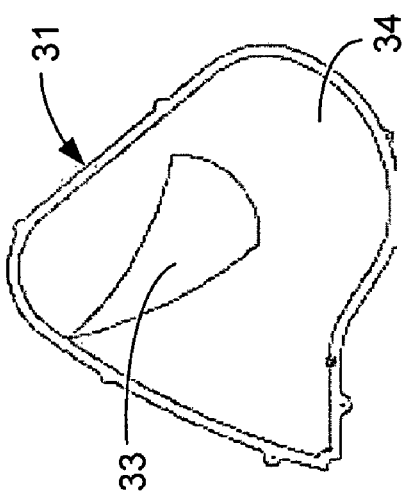
Figure 8L:
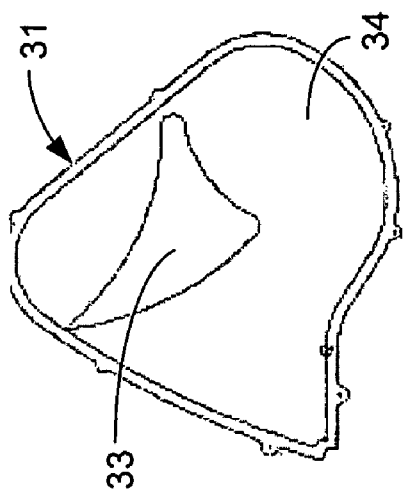

Also referring to FIG. 7, the airbag assembly 30 may further include at least one tether 41. The tether 41 may be coupled to the airbag 31 using conventional methods (e.g., stitching) to improve airbag deployment, or may be used to modify airbag stiffness by controlling the opening or closing of a vent hole 40. The tether 41 may be coupled to the inside of the chamber of the airbag, may be coupled to the exterior of the airbag, or any useful combination or configuration. According to an exemplary embodiment, the tether 41 may be brought into tension induced by the expansion of the inflated chamber 34 being filled with inflation gas. During deployment, but prior to contact with an occupant, this tension in the tether 41 may exert a closure force which exceeds the force from the inflation gas trying to open the vent hole 40, therefore keeping the vent hole 40 shut and prohibiting inflation gas from exhausting out through the vent hole 40. However, upon contact between the occupant 23 and the airbag 31, the tension in the tether 41 is reduced due to the force imparted onto a portion of the inflated chamber 34 proximate to the tether 41 by contact from the occupant being accelerated. When the opening force on the vent hole 40 (exerted by the inflation gas within the inflated chamber 34 pressurizing the chamber) exceeds the closing force on the vent hole 40 (from the tension in the tether 41), the vent hole 40 opens allowing inflation gas to exhaust (or vent) out of the inflated chamber 34. The inflation gas exhausted through the vent hole 40 may vent into the second inflated chamber 35, inflating the second inflated chamber 35. The second inflated chamber 35 is inflated to a pressure that is lower than the pressure in the inflated chamber 34, reducing the stiffness of the airbag 31 upon occupant impact. According to various exemplary embodiments, the size of the vent hole 40 may be increased or decreased to tailor the amount of gas flowing into the second chamber 35 and thus to tailor the stiffness of the airbag 31.

Figure 13:
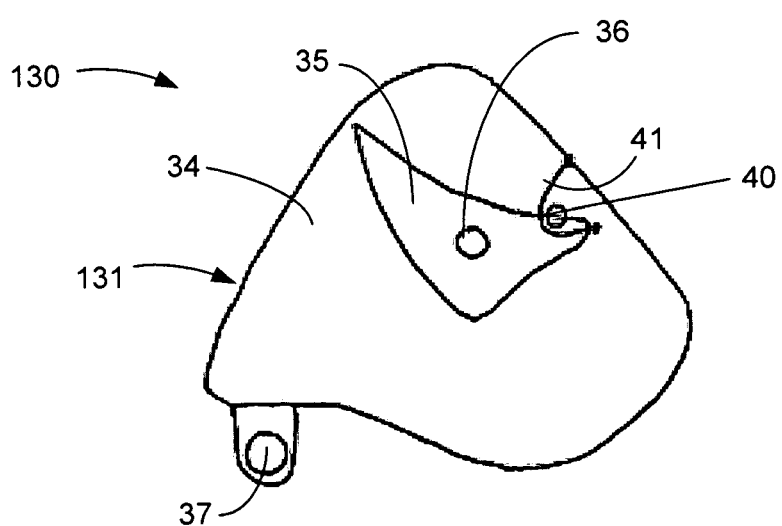
FIG. 13 is a cross-car view of a passenger airbag assembly with multiple inflated portions, shown in the unfolded or deployed state, according to an exemplary embodiment.

According to another exemplary embodiment illustrated in FIG. 13, a multiple chamber airbag assembly 130 is shown and includes an airbag 131 and a gas generator 37. Airbag 131 includes a first inflated chamber 34, a second inflated chamber 35, a vent hole 40, and a tether 41. During a vehicle dynamic event that triggers deployment of the airbag assembly 130, the gas generator 37 generates and forces inflation gas directly into the first inflated chamber 34, expanding and unfolding the airbag 131. The tether 41 may be coupled to the airbag 131 so that as the airbag 131 expands and pressure within first inflated chamber 34 increases, the tension in the tether 41 will also increase, whereby the tension in the tether 41 imparts a closure force onto the valve cover of the vent hole 40, which exceeds the force from the inside pressure of the first inflated chamber 34 trying to open the valve cover of the vent hole 40. The airbag assembly 130 is configured so that when an occupant contacts the airbag 131 (induced by deceleration of the vehicle during impact), the force from the occupant compresses a portion of the inflated chamber 34 proximate to the tether 41. This compressing reduces the tension in the tether 41 so that the force from the inside pressure of the first inflated chamber 34 exceeds the closure force imparted on the valve cover of the vent hole 40 by the tether 41, thereby opening the valve cover of the vent hole 40. According to this embodiment, when the valve cover of the vent hole 40 is open, inflation gas exhausts from the first inflated chamber 34 through vent hole 40 into the second inflated chamber 35. This venting may reduce occupant impact by tailoring the stiffness of the airbag to reduce the energy imparted into the occupant from contact with the airbag by directing some energy to diffuse gas from the first inflated chamber 34 into the second inflated chamber 35.

The multiple chamber airbag assemblies, as disclosed, in addition to improving occupant restraint also retain the advantage of having a possible volume reduction, since the inflation gas used to inflate the second inflated chamber 35 is reused, or first used to inflate the first inflated chamber 34. By reducing the airbag volume that the gas generator 37 directly inflates, the use of a smaller and less expensive gas generator may be permissible. According to other embodiments, the same gas generator may be used, but the inclusion of a non-inflated volume within the airbag assembly allows for the size of the airbag to increase in the direction toward the occupant and still have substantially the same inflated volume as an airbag configured without a non-inflated portion. The airbag having the non-inflated portion may improve occupant protection by minimizing deflection and acceleration of the occupant, by providing a contact position between occupant and airbag which is closer to the position of the occupant prior to the vehicle dynamic impact event.

According to the exemplary embodiment shown in FIG. 13, the airbag assembly 130 may further include a non-inflated or less inflated portion 35. According to other embodiments, a multiple chamber airbag assembly may include the non-inflated or less inflated portion 35 within the first inflated chamber, between any two or more chambers, or configured in any useful manner. The multiple chamber airbag assembly 130 may also include more than one vent hole 40, for example to vent from the first inflated chamber 34 to the non-inflated or low pressure portion 35. One or more other vent holes 36 may be used to exhaust gas from any chamber to outside of the airbag assembly 130. By venting inflation gas through multiple chambers prior to exhausting the gas to the atmosphere (i.e., or outside the airbag assembly), the temperature of the gas is lowered, reducing the chance of damage (e.g., burn damage) to the vehicle or occupants from the gas. The multiple chamber airbag assembly 130 may also include more than one tether 41.

The airbag assembly 30, 130 may further include a side panel 32, which may be made from a traditional airbag material, such as high strength nylon. The side panel 32 may comprise one or more panels coupled through a conventional method, such as stitching. According to an exemplary embodiment, the side panel 32 may be coupled using conventional methods (e.g., stitching) to the first inflated chamber 34 of the airbag 31,131 to form the second inflated chamber 35, such as shown in FIG. 13. According to other embodiments, the side panel 32 may be coupled to any feature or member of the airbag 31,131, or any combination of features or members of the airbag 31,131, to form at least one chamber that is indirectly inflated from inflatable chamber 34 through at least one vent hole 40. The side panel 32 may further include a vent 36 for venting exhaust gases from the second inflated chamber 35 to the atmosphere. The vent 36 may be positioned on one or both sides of the second inflated chamber 35. The side panel 32 may be configured to form a non-inflated portion 35 when coupled to the airbag 31,131 or coupled to a second side panel.

Referring to FIGS. 9a and 9b, an airbag assembly 330 is illustrated in its deployed or unfolded state, and includes a gas generator 37 and an airbag 331. The airbag 331 includes an inflated chamber 34 and a non-inflated portion 33. The non-inflated portion 33 comprises a cross-car portion and a fore-aft portion. The cross-car portion of the non-inflated portion 33, as shown, may be substantially ear-shaped and may run the entire width of the airbag 331. The non-inflated portion 33 may have varying shapes and varying widths and may be configured in varying positions along the airbag 331. The fore-aft portion of the non-inflated portion 33, as shown, may be substantially oval-shaped and may extend from the rear-most surface (i.e., the leading edge during deployment) of the airbag 331 to the cross-car portion of the non-inflated portion 33. According to other embodiments, the fore-aft portion may have varying shapes, may extend having varying depths, and may have varying positions. According to an exemplary embodiment, the fore-aft portion of the non-inflated portion 33 is positioned to retain the head of the occupant during a dynamic impact in a manner that does not generate a moment about the base of the neck of the occupant (in a clockwise or counterclockwise rotation in a cross-car view, such as FIG. 9a) that could induce whiplash of the occupant. The fore-aft portion of the non-inflated portion 33 may be configured to reduce forces into the head and neck of the occupant, during airbag deployment, but maintain the required high stiffness of the airbag 331 in the regions supporting the shoulders of the occupant.

Referring to FIGS. 10a-10c, an airbag assembly 430 is illustrated in its deployed or unfolded state, and includes a gas generator 37 and an airbag 431. The airbag 431 may be made from one or more than one panel coupled together, and includes an inflated chamber 34, a non-inflated portion 33, and at least one pocket 38 (or split). The pocket 38 may form an exterior void along the airbag 431, for example a V-shaped void with the base of the V pointing toward the inside of the airbag. A pocket, such as pockets 38, 38' may reduce the inflated volume of the airbag 431 or may lessen impact with the occupant. According to an exemplary embodiment, pocket 38 may be formed in the center (cross-car) of the rear facing surface (i.e., leading edge during deployment) of the airbag 431 and may have a non-inflated portion 33 positioned forward of the pocket 38. When the airbag 431 is deployed, the pocket 38 is configured to lower the restraint forces imparted into the head and chest of the occupant, by allowing the shoulders of the occupant to absorb more impact loads. The airbag assembly 430, having a non-inflated portion 33 positioned forward of the pocket 38, may further reduce impact with the occupant by having a tailored stiffness through the region of contact with the head, neck and upper chest of the occupant. The tailored stiffness may result in relative lower restraint forces imparted from airbag 431 to the head and neck of the occupant. The pockets 38, 38' may be configured to reduce impact for out of position occupants as well.

Referring to FIGS. 11a and 11b, an airbag assembly 530 is illustrated in its deployed or unfolded state, and includes a gas generator 37 and an airbag 531. The airbag 531 includes an inflated chamber 34 and a non-inflated portion 33. According to an exemplary embodiment, the inflated chamber 34, when deployed, may have a rearward facing lower portion 46 which has a substantially trapezoidal shape. The trapezoidal shape may have a V-shaped notch when viewed from the rearward direction (i.e., by the occupant). The trapezoidal shape may also have a rearward facing upper portion 45 that necks down from a width that may be substantially the same as the width of the lower portion 46. The shape of the upper portion 45 may substantially correspond and mate to the V-shaped notch in the lower portion 46. The upper and lower portions 45, 46 may have a tongue-and-groove style interface. The V-shaped configuration of the upper portion 45 of the airbag 531 allows for a varying stiffness of airbag 531, which results in lower restraint forces imparted into the head and neck regions of the occupant during impact. The V-shaped configuration of the lower portion 46 of airbag 531 also allows a varying stiffness of the airbag 531. The varying stiffness may result in a relatively higher stiffness to the portions that support the shoulders of the occupant, imparting relatively higher restraint forces into the shoulders. Therefore, the V-shape configuration may reduce loading into the head, neck, and central chest region of the occupant and allow for the relative higher loading to take place through the shoulders, less vital areas of the occupant. Additionally, the V-shaped configuration of the upper and lower portions 45, 46 may offer improved restraint for different sized occupants, because taller occupants generally have broader shoulders and shorter occupants generally have narrower shoulders. Therefore, the V-shape configuration of the airbag supports different sized occupants.

According to other embodiments, the shapes and sizes of the upper and lower portions of the airbag may vary, or the airbag assemblies may also include pockets, or tethers. Additionally, the shape, size, and position of the non-inflated portion 33 may be modified to tailor the stiffness of the airbag to accommodate varying customer requirements.

Figure 12C:
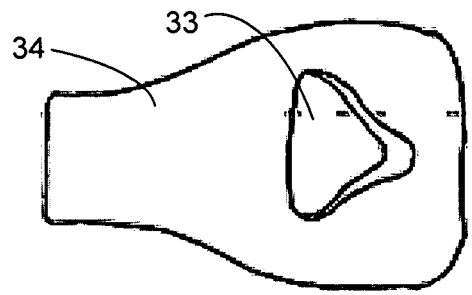
FIG. 12c is a top view of the airbag assembly of FIG. 12a, shown in the unfolded or deployed state, according to an exemplary embodiment.
Figure 12A:
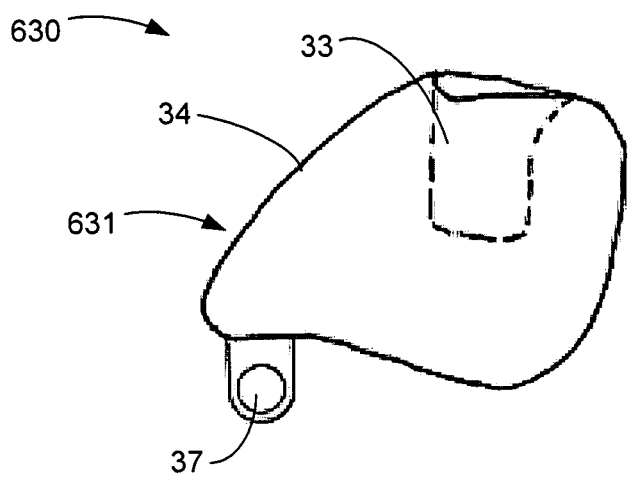
FIG. 12a is a cross-car view of a passenger airbag assembly with a non-inflated portion, shown in the unfolded or deployed state, according to another exemplary embodiment.
Figure 12B:
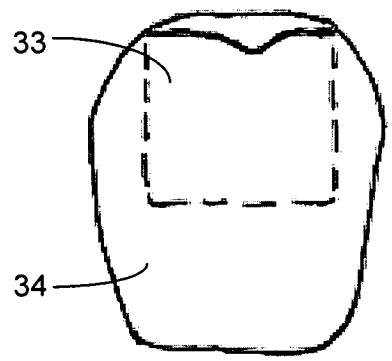
FIG. 12b is a rear view of the airbag assembly of FIG. 12a, shown in the unfolded or deployed state, according to an exemplary embodiment.

Referring to FIGS. 12a-12c, an airbag assembly 630 is illustrated in its deployed or unfolded state, and includes a gas generator 37 and an airbag 631. The airbag 631 includes an inflated chamber 34 and a non-inflated portion 33. The non-inflated portion 33, according to an exemplary embodiment, may extend in a substantially vertical direction from the top of the airbag 631 to an approximate midpoint of the depth of the airbag 631. The non-inflated portion 33 may have a cross-section (when viewed from the top) that is substantially triangular when the airbag 631 is deployed. According to other embodiments, the non-inflated portion 33 may extend from other surfaces, such as from the bottom surface, and may extend all the way through the depth, width, or thickness of the airbag, or may extend less than the full depth, width, or thickness of the airbag. Additionally, the cross-section may be varied to tailor the stiffness of airbag 631.

Figure 15:
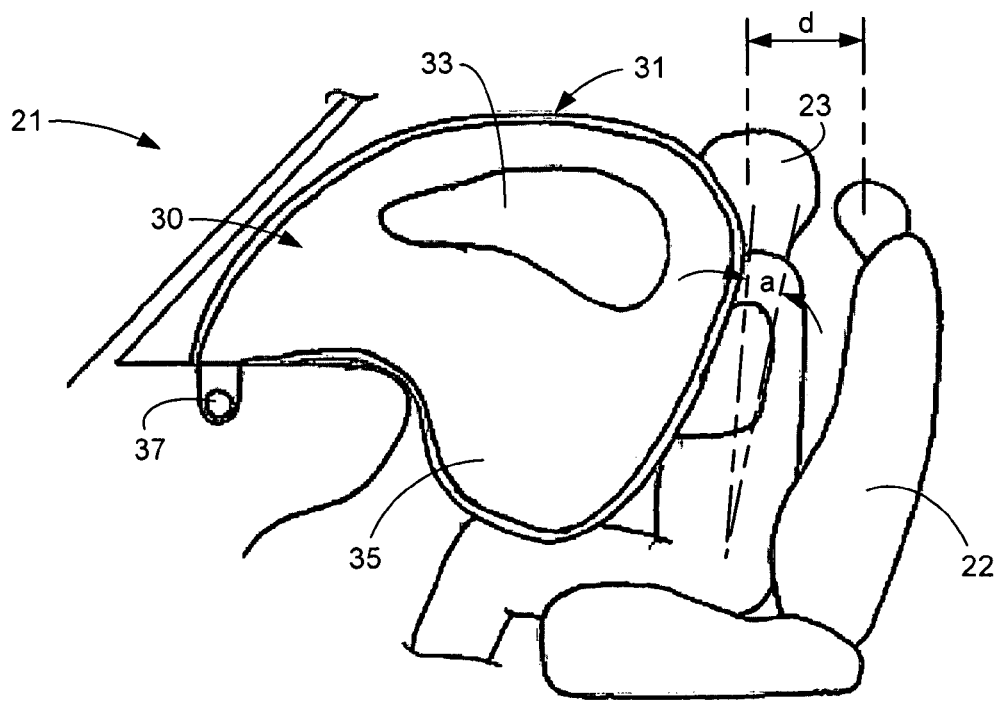
FIG. 15 is a cross-car view of a passenger airbag assembly with a non-inflated portion shown in the unfolded or deployed state and illustrating the decreased deflection of the occupant, according to an exemplary embodiment.

Referring to FIG. 15, the airbag assembly 30 is shown in the deployed or unfolded state with the airbag 31 supporting the occupant 23 at the time of contact, and illustrates an advantage of the airbag assembly 30 over a conventional passenger airbag 61, shown in FIG. 14. The airbag 31 may have substantially the same inflated volume as the conventional airbag 61, but because the airbag 31 has a non-inflated portion 33, the airbag 31 is longer in the fore-aft direction. Having the same inflated volume allows for each airbag assembly to be constructed using the same gas generator 37, however, because the airbag 31 is longer in the fore-aft direction, the airbag 31 allows for a lower displacement "d" and angle of rotation "a" of the occupant 23 (as illustrated in FIG. 15) compared to the displacement "D" and angle of rotation "A" of the occupant 23 (as illustrated in FIG. 14) for the conventional airbag 61. The displacement "d" and "D" correspond to the fore-aft distance the occupant travels from the initial pre-vehicle impact position to the occupant-airbag impact position. Therefore, by allowing less displacement of the occupant relative to conventional airbags, the airbag 31 having a non-inflated portion 33 reduces impact of the occupant by restraining the occupant when the occupant has a lower energy and inertia. The more displacement ("D" or "d") the occupant is allowed to undergo during a vehicle dynamic impact event, the higher the acceleration of the occupant is upon impact with the airbag, resulting in higher restraint forces imparted from the airbag onto the occupant.

Figures 16A, 16B:
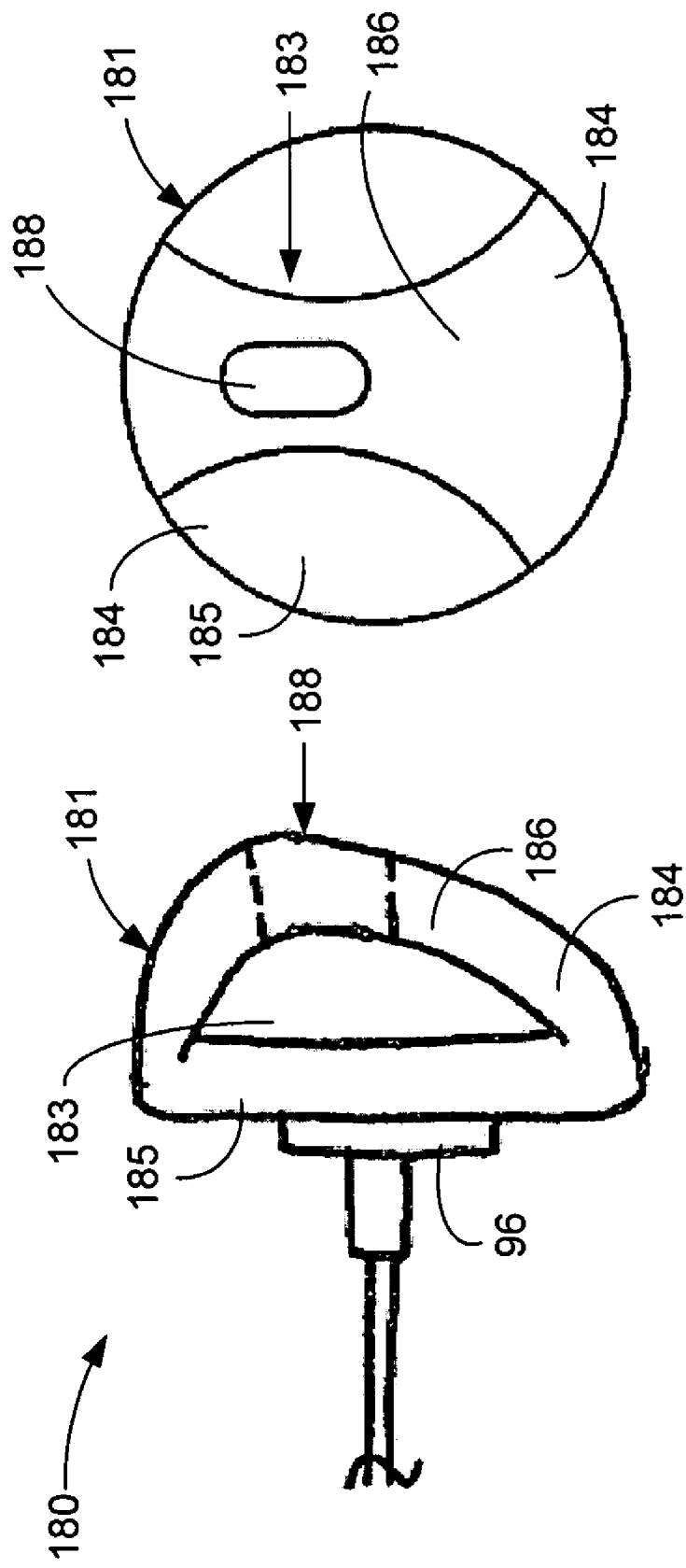
FIG. 16a is a cross-car view of a driver airbag assembly with a non-inflated portion, shown in the unfolded or deployed state, according to another exemplary embodiment.
FIG. 16b is a rear view of the airbag assembly of FIG. 16a, shown in the unfolded or deployed state, according to an exemplary embodiment.

Referring to FIGS. 16a and 16b, a driver airbag assembly 180 is illustrated in its deployed or unfolded state, and includes an airbag 181. The airbag 181 may be coupled directly to the steering assembly 96 of a vehicle, such as the vehicle 20. The airbag 181 may include a gas generator, which generates and forces inflation gas directly into the airbag 181 when triggered by a dynamic impact event. During deployment, the airbag 181 includes an inflated chamber 184 and a non-inflated portion 183. According to an exemplary embodiment, the inflated chamber 184 includes a round base portion 185 (when viewed by the driver) that has a substantially uniform thickness. The inflated chamber 184 may also include a support portion 186 that is interconnected to the base 185 at the bottom and the top side. As shown, the support portion 186 and the base portion 185 may be separated by a gap having a varying depth between the interconnections on the top and bottom sides. The support portion 186, according to the exemplary embodiment shown, may be wider at the top and bottom sides relative to the center portion, such that the side surfaces are concave. According to other embodiments, the support portion 186 may have any useful profile when viewed the rear. The support portion 186 includes a pocket 188, which according to an exemplary embodiment, is oval shaped when viewed from the rear and extends through the entire fore-aft depth of the support portion 186. The pocket 188 may be configured to form any useful shape and may extend the entire depth or any distance less than the entire depth of the support portion 186. The pocket 188 is configured to accept a portion of the head or facial region of the occupant to reduce the restraint forces imparted into the head and neck regions to reduce occupant impact.

The non-inflated portion 183 forms the void that separates the base portion 185 and the support portion 186 of the inflated chamber 184 of the airbag 181, in the fore-aft direction. According to an exemplary embodiment, the non-inflated portion 183 forms substantially a D-shape when viewed from the cross-car direction. The non-inflated portion 183 may take the form of any useful shape, and is configured to provide variable stiffness of the airbag 181 to reduce occupant impact with the airbag 181. The stiffness of the driver airbag 181 may be tailored like the passenger airbags disclosed in this application, through variable configuration of the shape, size, and position of the non-inflated portion 183.

According to other exemplary embodiments, the airbag assembly 30 may include an airbag or portions of an airbag as disclosed in U.S. Patent Application Publication No. 2005/0206138, which is herein incorporated by reference in its entirety. According to other exemplary embodiments, Airbag assemblies having a non-inflated portion improve restraint and reduce impact through reducing the restraint forces imparted onto the occupant by reducing the deflection and acceleration the occupant undergoes during an impact, and by having a tailored stiffness, which may be variably configured along its profile to further reduce restraint forces imparted to vital areas of the occupant, such as the head and neck regions. Additionally, airbags having non-inflated regions may be coupled with new pre-crash technology to further improve restraint. For example, a vehicle may include new pre-crash technology, which may through sensors measure the velocity, displacement, and acceleration of the vehicle relative to other objects, and may inform the vehicle of a crash before actual impact of the vehicle. Currently, airbags are deployed using sensors that detect impact of the vehicle, so technology that predicts impact could be used to deploy the airbags sooner. This technology coupled with airbags having non-inflated portions, could further mitigate the restraint forces exerted onto an occupant during a vehicle dynamic impact event by minimizing the deflection an occupant travels during a crash event.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the multiple chamber air bag system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An airbag module for protecting an occupant of a vehicle, the module comprising:
   an airbag including an inflatable portion;
   an inflator for providing inflation gas for inflating the inflatable portion of the airbag;
   wherein the airbag includes a non-inflatable portion located within the inflatable portion so that in a longitudinal direction of the vehicle the non-inflatable portion is bounded on both sides by the inflatable portion of the airbag;
   wherein the non-inflatable portion extends an entire cross vehicle width of the airbag;
   wherein the airbag is configured to inflate into a position so that a surface of the airbag faces the occupant; and
   wherein the stiffness of the inflatable portion varies along the surface facing the occupant based on a changing distance from the surface to the non-inflatable portion.

2. The airbag module of claim 1, further comprising a venting mechanism for controlling escape of gas from the inflatable portion of the airbag.

3. The airbag module of claim 2, wherein the venting mechanism includes a tether for controlling the escape of gas from a vent hole of the inflatable portion.

4. The airbag module of claim 1, wherein the non-inflatable portion of the airbag comprises a gap or void open to the atmosphere.

5. The airbag module of claim 1, wherein the non-inflatable portion comprises a pocket in an upper surface of the inflatable portion.

6. The airbag module of claim 1, wherein the inflatable portion comprises multiple inflatable chambers.

7. The airbag module of claim 6, wherein the multiple inflatable chambers mate together when the airbag deploys.

8. The airbag module of claim 1, wherein a volumetric ratio of a volume of a space enveloped by the inflatable portion to a volume of the inflatable portion is greater than or equal to 1.2.

9. An airbag module for protecting an occupant of a vehicle, the module comprising:
   an airbag including an inflatable portion;
   an inflator for providing inflation gas for inflating the inflatable portion of the airbag;
   wherein the airbag includes a non-inflatable portion located within the inflatable portion;
   wherein the non-inflatable portion extends an entire cross vehicle width of the airbag;
   wherein the airbag is configured to inflate into a position so that a surface of the airbag faces the occupant; and
   wherein a volumetric ratio of a volume of a space enveloped by the inflatable portion to a volume of the inflatable portion is greater than or equal to 1.2.

10. The airbag module of claim 9, further comprising a venting mechanism for controlling escape of gas from the inflatable portion of the airbag to the non-inflatable portion of the airbag.

11. The airbag module of claim 10, wherein the venting mechanism includes a tether for controlling the escape of gas from a vent hole of the inflatable portion.

12. The airbag module of claim 9, wherein the non-inflatable portion of the airbag comprises a gap or void open to the atmosphere.

13. An airbag module for protecting an occupant of a vehicle, the module comprising:

an airbag including an inflatable portion;

an inflator for providing inflation gas for inflating the inflatable portion of the airbag;

wherein the airbag includes a non-inflatable portion located within the inflatable portion so that in a longitudinal direction of the vehicle the non-inflatable portion is bounded on both sides by the inflatable portion of the airbag;

wherein the non-inflatable portion extends an entire cross vehicle width of the airbag;

wherein the airbag is configured to inflate into a position so that a surface of the airbag faces the occupant;

wherein the inflatable portion includes first and second fluidly connected inflatable chambers connected by a flow restricting channel;

wherein the second inflatable chamber is located adjacent to the surface of the airbag facing the occupant; and wherein the inflation gas enters the second inflatable chamber after passing through the first inflatable chamber and the flow restricting channel so that after initiation of the inflator and prior to completion of the inflation of the airbag the stiffness of the airbag at a point on the surface adjacent the second inflatable chamber is less than the stiffness of the airbag at a point on the surface adjacent the first inflatable chambers.

14. The airbag module of claim 13, wherein the flow restricting channel includes a tether for controlling escape of gas from the first inflatable chamber to the second inflatable chamber.

15. The airbag module of claim 13, wherein the second inflatable chamber has an internal pressure less than an internal pressure of the first inflatable chamber when the airbag is deployed.

16. The airbag module of claim 13, wherein a volumetric ratio of a volume of a space enveloped by the first inflatable chamber to a volume of the first inflatable chamber is greater than or equal to 1.2.

17. An airbag module for protecting an occupant of a vehicle, the module comprising:

an airbag including an inflatable portion;

an inflator for providing inflation gas for inflating the inflatable portion of the airbag;

wherein the airbag includes a low pressure inflatable portion located within the inflatable portion so that in a longitudinal direction of the vehicle the low pressure inflatable portion is bounded on both sides by the inflatable portion of the airbag;

wherein the low pressure inflatable portion extends an entire cross vehicle width of the airbag;

wherein the airbag is configured to inflate into a position so that a surface of the airbag faces the occupant;

wherein the inflatable portion includes first and second fluidly connected inflatable chambers connected by a flow restricting channel;

wherein the second inflatable chamber is located adjacent to the surface of the airbag facing the occupant;

wherein the inflation gas enters the second inflatable chamber after passing through the first inflatable chamber and the flow restricting channel; and wherein the second inflatable chamber includes a vent to allow the inflation gas to escape from the second inflatable chamber into the low pressure inflatable chamber so that the low pressure inflatable chamber inflates to a pressure less than the first and second inflatable chambers.

18. The airbag module of claim 17, further comprising a tether covering the vent, wherein the tether moves during deployment of the airbag to allow gas to escape from the second inflatable chamber through the vent.

19. The airbag module of claim 17, wherein the second inflatable chamber has an internal pressure less than an internal pressure of the first inflatable chamber when the airbag is deployed.

20. The airbag module of claim 17, wherein a volumetric ratio of a volume of a space enveloped by the first inflatable chamber to a volume of the first inflatable chamber is greater than or equal to 1.2.

* * * * *